US012712577B2

(12) United States Patent
Lu et al.

(10) Patent No.: US 12,712,577 B2
(45) Date of Patent: Aug. 18, 2026

(54) FEEDBACK RECEIVER (FBRX) PATH AND CLOSED LOOP CONTROL FOR TRANSMITTER (TX) INTERFERENCE CANCELLATION

(71) Applicant: QUALCOMM Incorporated, San Diego, CA (US)

(72) Inventors: Dai Lu, San Diego, CA (US); Cong Nguyen, San Diego, CA (US); Charline Hao, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 333 days.

(21) Appl. No.: 18/469,934

(22) Filed: Sep. 19, 2023

(65) Prior Publication Data

US 2025/0096827 A1 Mar. 20, 2025

(51) Int. Cl.
*H04B 1/04* (2006.01)
*H04B 1/10* (2006.01)
*H04L 5/14* (2006.01)

(52) U.S. Cl.
CPC .................................. *H04B 1/0475* (2013.01)

(58) Field of Classification Search
None
See application file for complete search history.

(56) References Cited

U.S. PATENT DOCUMENTS 11,757,606 B2 * 9/2023 Khandani ............. H04W 12/04 370/278
11,764,825 B2 * 9/2023 Choi .................... H04B 1/0067 455/303
2014/0198691 A1 7/2014 Oberhammer et al.
2014/0348018 A1 11/2014 Bharadia et al.
2015/0063176 A1 * 3/2015 Hong ................. H04B 7/15585 370/279
2015/0171903 A1 * 6/2015 Mehlman .............. H04L 5/1461 375/346
2015/0180522 A1 6/2015 Wyville
2017/0111155 A1 * 4/2017 Liu ........................... H04L 5/14
2017/0230210 A1 8/2017 Narasimha et al.
2017/0353212 A1 12/2017 Bharadia et al.
2018/0115370 A1 4/2018 Kim et al.
2019/0372610 A1 * 12/2019 Choi ........................ H04B 1/10
2021/0184722 A1 6/2021 Wala et al.
2023/0051798 A1 2/2023 Choi et al.

OTHER PUBLICATIONS

International Search Report and Written Opinion—PCT/US2024/047071—ISA/EPO—Dec. 16, 2024.

* cited by examiner

*Primary Examiner* — Pablo N Tran
(74) *Attorney, Agent, or Firm* — Gerald P. Joyce, III

(57) ABSTRACT

Certain aspects of the present disclosure are directed towards apparatus and techniques for wireless communication. An example apparatus generally includes: a first transmit chain; a first receive chain; a first coupler coupled to the first transmit chain; a second coupler coupled to the first receive chain; a first analog interference cancellation (AIC) circuit having an input coupled to the first coupler and an output coupled to the first receive chain; and a first routing device coupled between the first coupler and the input of the first AIC circuit, the first routing device being further coupled between the first coupler and a digital interference cancellation (DIC) circuit.

30 Claims, 13 Drawing Sheets

FEEDBACK RECEIVER (FBRX) PATH AND CLOSED LOOP CONTROL FOR TRANSMITTER (TX) INTERFERENCE CANCELLATION

TECHNICAL FIELD

Certain aspects of the present disclosure generally relate to electronic circuits, and more particularly, to wireless transmitters.

BACKGROUND

Electronic devices include computing devices such as desktop computers, notebook computers, tablet computers, smartphones, wearable devices like a smartwatch, internet servers, and so forth. These various electronic devices provide information, entertainment, social interaction, security, safety, productivity, transportation, manufacturing, and other services to human users. These various electronic devices depend on wireless communications for many of their functions. Wireless communication systems and devices are widely deployed to provide various types of communication content such as voice, video, packet data, messaging, broadcast, and so on. These systems may be capable of supporting communication with multiple users by sharing the available system resources (e.g., time, frequency, and power). Examples of such systems include code division multiple access (CDMA) systems, time division multiple access (TDMA) systems, frequency division multiple access (FDMA) systems, and orthogonal frequency division multiple access (OFDMA) systems (e.g., a Long Term Evolution (LTE) system or a New Radio (NR) system). Wireless devices may include transmitters for processing signals for transmission via one or more antennas.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled “Detailed Description,” one will understand how the features of this disclosure provide the advantages described herein.

Certain aspects of the present disclosure are directed towards an apparatus for wireless communication. The apparatus generally includes: a first transmit chain; a first receive chain; a first coupler coupled to the first transmit chain; a second coupler coupled to the first receive chain; a first analog interference cancellation (AIC) circuit having an input coupled to the first coupler and an output coupled to the first receive chain via the second coupler; and a first routing device coupled between the first coupler and the input of the AIC circuit, the first routing device being further coupled between the first coupler and a digital interference cancellation (DIC) circuit.

Certain aspects of the present disclosure are directed towards a method for wireless communication. The method generally includes: transmitting a first transmit signal via a first transmit chain; receiving a first receive signal via a first receive chain; providing, to a first routing device via a first coupler, a first interference signal representing a signal at a node of the transmit chain; and providing, via the first routing device, the first interference signal to at least one of a first AIC circuit or a DIC circuit, an output of the first AIC circuit being coupled to a second coupler, wherein the second coupler is coupled to the first receive chain.

Certain aspects of the present disclosure are directed towards an apparatus for wireless communication. The apparatus generally includes: means for generating a transmit signal; means for processing a receive signal; means for providing an interference signal representing a signal at a node of the means for transmitting; means for processing the interference signal to yield an interference reduction signal; means for providing the interference reduction signal to the means for receiving; and means for providing the interference signal to a DIC circuit.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be by reference to aspects, some of which are illustrated in the appended drawings. It is to be noted, however, that the appended drawings illustrate only certain aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Certain aspects of the present disclosure generally relate to interference cancellation for a transceiver. In some aspects, the transceiver may include a power amplifier (PA) and a coupler coupled to an output of the PA. The coupler may provide an interference signal to a routing device (e.g., a switch or splitter), which may provide the interference signal to an analog interference cancellation (AIC) circuit, to a digital interference cancellation (DIC) circuit, or both. The AIC may be performed in a radio frequency (RF), intermediate frequency (IF), and/or baseband (BB) frequency domain. In some aspects, the interference signal may be provided to the DIC circuit for digital predistortion (DPD). In some implementations, the AIC may be assisted by information from DPD processing. For example, the AIC circuit may be implemented with multiple AIC paths, each including a subband filter or delay element. Based on processing the interference signal for DPD in the digital domain, the AIC paths may be controlled (e.g., one or more AIC paths may be selected for interference cancellation). In some cases, AIC may be performed in the RF domain for a subset of channels and in the IF and/or BB domain for another subset of channels. In some aspects, AIC may be performed in the RF domain or the IF and/or BB domain based on an interference-to-receiver noise floor ratio (INR). Certain aspects of the present disclosure also provide techniques for interference cancellation for multiple-input multiple-output (MIMO) implementations, as described in more detail herein.

Example Wireless Communications

Figure 1:
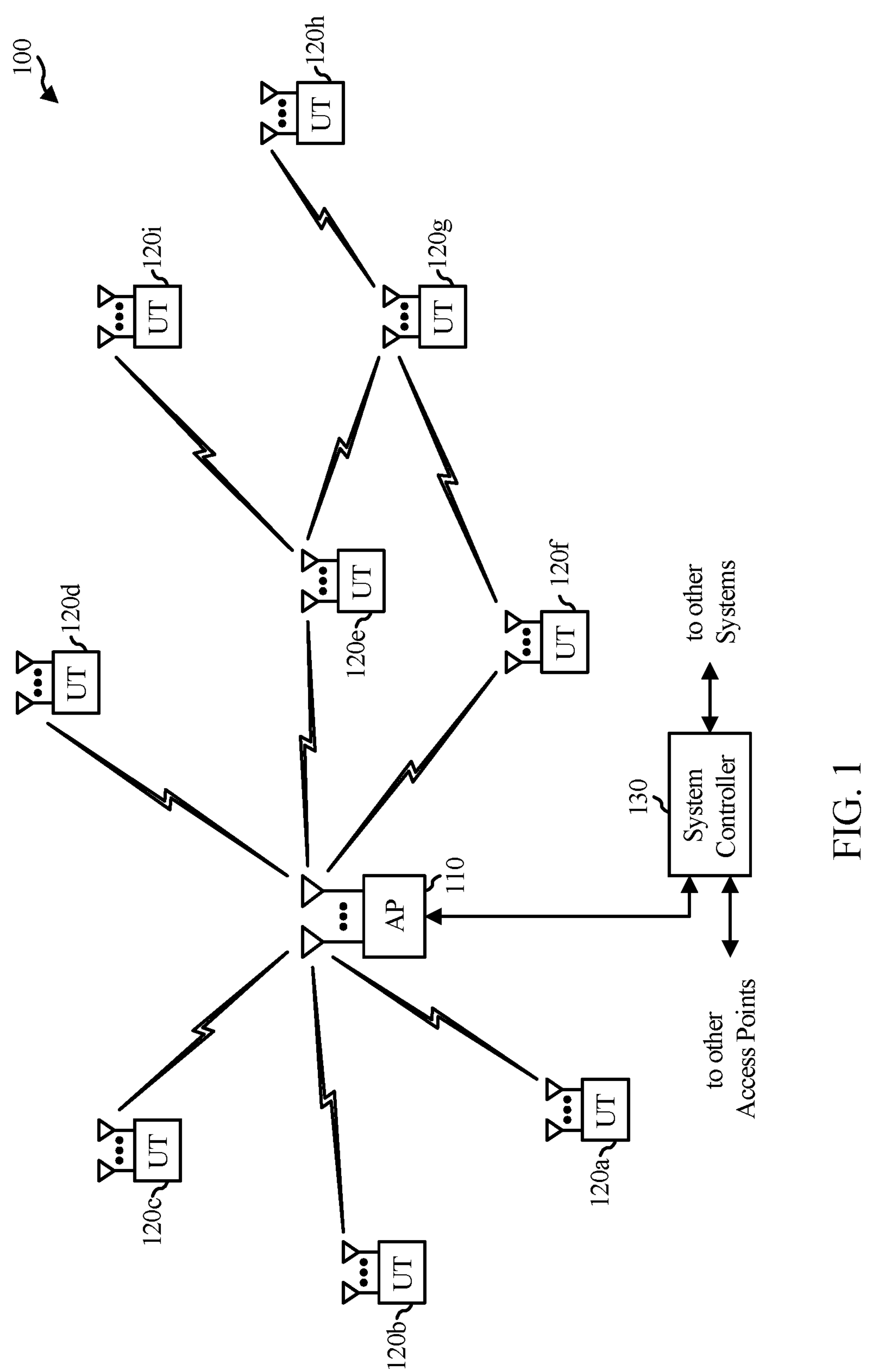
FIG. 1 is a diagram of an example wireless communications network, in which aspects of the present disclosure may be practiced.

FIG. 1 illustrates a wireless communications system 100 with access points 110 and user terminals 120, in which aspects of the present disclosure may be practiced. For simplicity, only one access point 110 is shown in FIG. 1. An access point (AP) is generally a fixed station that communicates with the user terminals and may also be referred to as a base station (BS), an evolved Node B (eNB), a next generation Node B (gNB), or some other terminology. A user terminal (UT) may be fixed or mobile and may also be referred to as a mobile station (MS), an access terminal, user equipment (UE), a station (STA), a client, a wireless device, or some other terminology. A user terminal may be a wireless device, such as a cellular phone, a personal digital assistant (PDA), a handheld device, a wireless modem, a laptop computer, a tablet, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

Wireless communications system 100 employs multiple transmit and multiple receive antennas for data transmission on the downlink and uplink. Access point 110 may be equipped with a number $N_{ap}$ of antennas to achieve transmit diversity for downlink transmissions and/or receive diversity for uplink transmissions. A set $N_u$ of selected user terminals 120 may receive downlink transmissions and transmit uplink transmissions. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

Wireless communications system 100 may be a time division duplex (TDD) system or a frequency division duplex (FDD) system. For a TDD system, the downlink and uplink share the same frequency band. For an FDD system, the downlink and uplink use different frequency bands. Wireless communications system 100 may also utilize a single carrier or multiple carriers for transmission. Each user terminal 120 may be equipped with a single antenna (e.g., to keep costs down) or multiple antennas (e.g., where the additional cost can be supported). The user terminal 120 or access point 110 may include circuitry facilitating analog and digital interference cancellation, as described in more detail herein.

Figure 2:
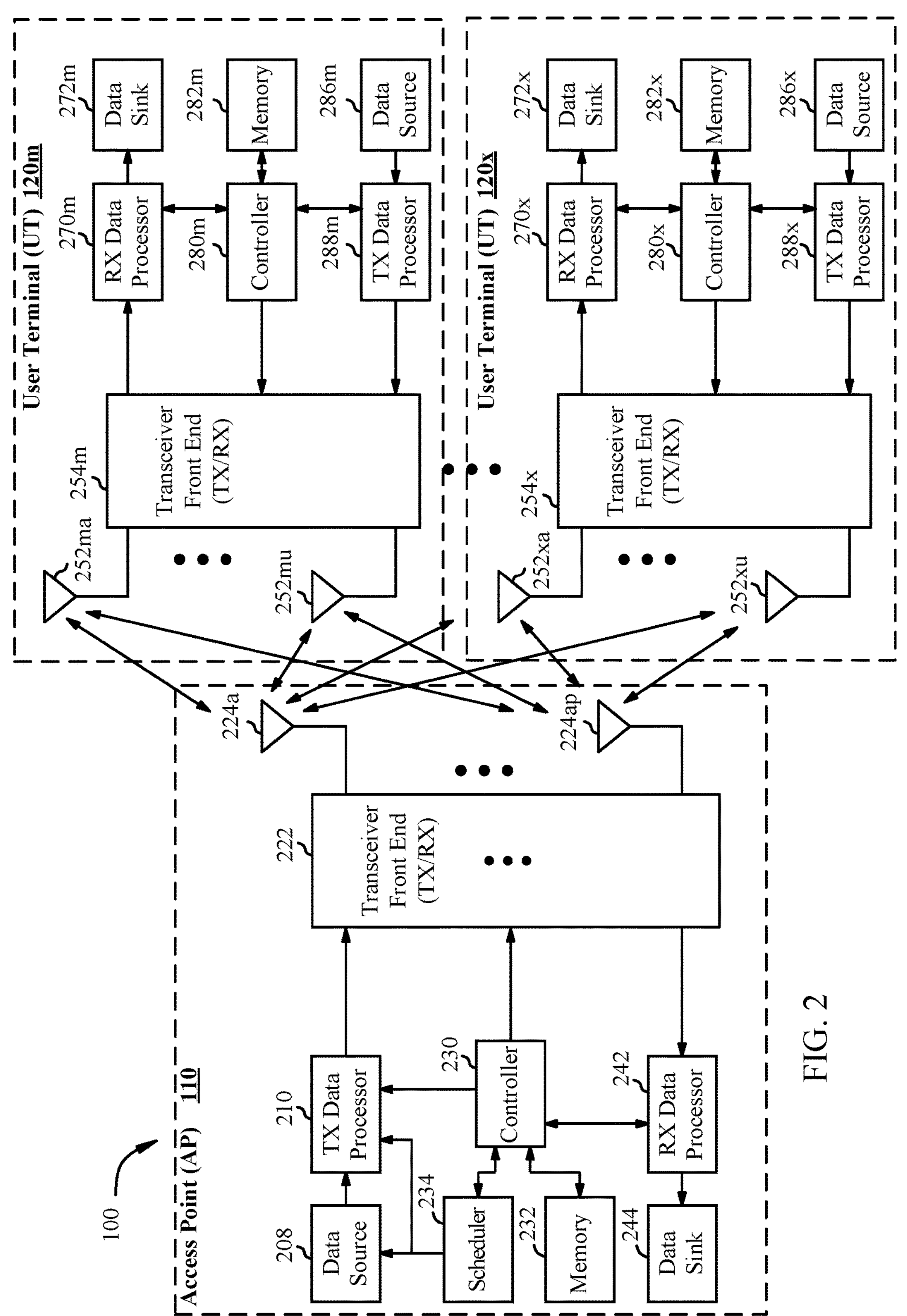
FIG. 2 is a block diagram of an example access point (AP) and example user terminals, in which aspects of the present disclosure may be practiced.

FIG. 2 shows a block diagram of access point 110 and two user terminals **120*m* and 120*x* in the wireless communications system 100. Access point 110 is equipped with $N_{ap}$ antennas 224*a* through 224*ap*. User terminal 120*m* is equipped with $N_{ut,m}$ antennas 252*ma* through 252*mu*, and user terminal 120*x* is equipped with $N_{ut,x}$ antennas 252*xa* through 252*xu*. Access point 110 is a transmitting entity for the downlink and a receiving entity for the uplink. Each user terminal 120** is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous reception on the downlink, $N_{up}$ may or may not be equal to $N_{dn}$, and $N_{up}$ and $N_{dn}$ may be static values or can change for each scheduling interval. Beam-steering, beamforming, or some other spatial processing technique may be used at the access point and/or user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up}\}$ for the user terminal based on the coding and modulation schemes associated with the rate selected for the user terminal and provides a data symbol stream $\{s_{up}\}$ for one of the $N_{ut,m}$ antennas. A transceiver front end (TX/RX) 254 (also known as a radio frequency front end (RFFE)) receives and processes (e.g., converts to analog, amplifies, filters, and frequency upconverts) a respective symbol stream to generate an uplink signal. The transceiver front end 254 may also route the uplink signal to one of the $N_{ut,m}$ antennas for transmit diversity via an RF switch, for example. The controller 280 may control the routing within the transceiver front end 254. Memory 282 may store data and program codes for the user terminal 120 and may interface with the controller 280.

A number $N_{up}$ of user terminals 120 may be scheduled for simultaneous transmission on the uplink. Each of these user terminals transmits its set of processed symbol streams on the uplink to the access point.

At access point 110, $N_{ap}$ antennas 224*a* through 224*ap* receive the uplink signals from all $N_{up}$ user terminals transmitting on the uplink. For receive diversity, a transceiver front end 222 may select signals received from one of the antennas 224 for processing. The signals received from multiple antennas 224 may be combined for enhanced receive diversity (e.g., best signal-to-noise ratio (SNR)). The access point's transceiver front end 222 also performs processing complementary to that performed by the user terminal's transceiver front end 254 and provides a recovered uplink data symbol stream. The recovered uplink data symbol stream is an estimate of a data symbol stream $\{s_{up}\}$ transmitted by a user terminal. An RX data processor 242 processes (e.g., demodulates, deinterleaves, and decodes) the recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for Nan user terminals scheduled for downlink transmission, control data from a controller 230 and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 may provide a downlink data symbol streams for one of more of the $N_{dn}$ user terminals to be transmitted from one of the $N_{ap}$ antennas. The transceiver front end 222 receives and processes (e.g., converts to analog, amplifies, filters, and frequency upconverts) the symbol stream to generate a downlink signal. The transceiver front end 222 may also route the downlink signal to one or more of the $N_{ap}$ antennas 224 for transmit diversity via an RF switch, for example. The controller 230 may control the routing within the transceiver front end 222. Memory 232 may store data and program codes for the access point 110 and may interface with the controller 230.

At each user terminal 120, $N_{ut,m}$ antennas 252 receive the downlink signals from access point 110. For receive diversity at the user terminal 120, the transceiver front end 254 may select signals received from one or more of the antennas 252 for processing. The signals received from multiple antennas 252 may be combined for enhanced receive diversity. The user terminal's transceiver front end 254 also performs processing complementary to that performed by the access point's transceiver front end 222 and provides a recovered downlink data symbol stream. An RX data processor 270 processes (e.g., demodulates, deinterleaves, and decodes) the recovered downlink data symbol stream to obtain decoded data for the user terminal. The transceiver front end 222 may include may include circuitry facilitating analog and digital interference cancellation, as described in more detail herein.

Figure 3:
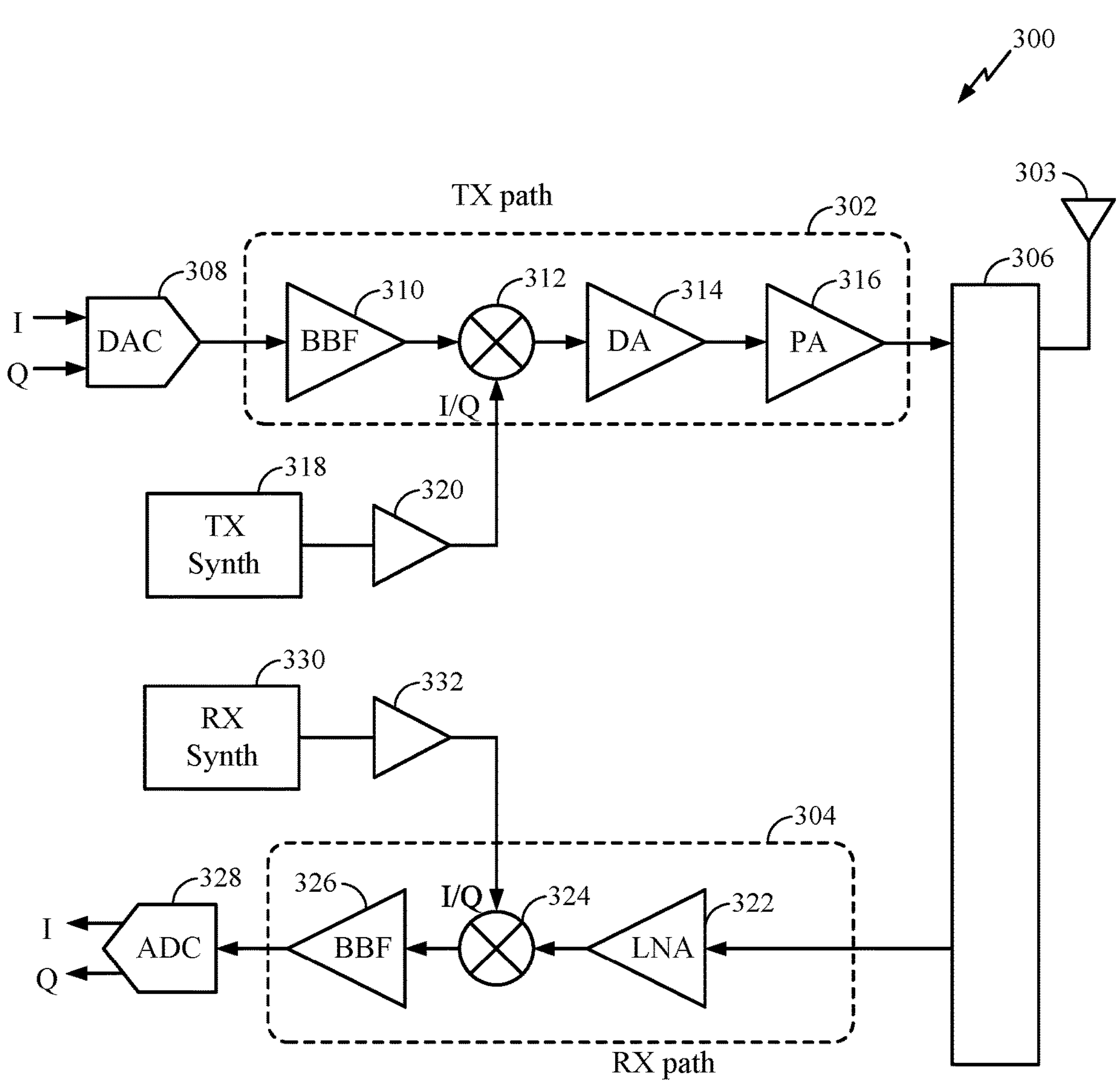
FIG. 3 is a block diagram of an example transceiver front end, in which aspects of the present disclosure may be practiced.

FIG. 3 is a block diagram of an example transceiver front end 300, such as transceiver front ends 222, 254 in FIG. 2, in which aspects of the present disclosure may be practiced. The transceiver front end 300 includes a transmit (TX) path 302 (also known as a transmit chain) for transmitting signals via one or more antennas and a receive (RX) path 304 (also known as a receive chain) for receiving signals via the antennas. When the TX path 302 and the RX path 304 share an antenna 303, the paths may be connected with the antenna via an interface 306, which may include any of various suitable RF devices, such as a switch, a duplexer (e.g., or a circulator), a diplexer, a multiplexer, and the like.

Receiving in-phase (I) or quadrature (Q) baseband analog signals from a digital-to-analog converter (DAC) 308, the TX path 302 may include a baseband filter (BBF) 310, a mixer 312, a driver amplifier (DA) 314, and a power amplifier (PA) 316. The BBF 310, the mixer 312, and the DA 314 may be included in a radio frequency integrated circuit (RFIC). For certain aspects, the PA 316 may be external to the RFIC.

The BBF 310 filters the baseband signals received from the DAC 308, and the mixer 312 mixes the filtered baseband signals with a transmit local oscillator (LO) signal to convert the baseband signal of interest to a different frequency (e.g., upconvert from baseband to RF). This frequency-conversion process produces the sum and difference frequencies between the LO frequency and the frequencies of the baseband signal of interest. The sum and difference frequencies are referred to as the "beat frequencies". The beat frequencies are typically in the RF range, such that the signals output by the mixer 312 are typically RF signals, which may be amplified by the DA 314 and/or by the PA 316 before transmission by the antenna 303. While one mixer 312 is illustrated, several mixers may be used to upconvert the filtered baseband signals to one or more intermediate frequencies and to thereafter upconvert the intermediate frequency (IF) signals to a frequency for transmission.

The RX path 304 includes a low noise amplifier (LNA) 322, a mixer 324, and a baseband filter (BBF) 326. The LNA 322, the mixer 324, and the BBF 326 may be included in one or more RFICs, which may or may not include the same RFIC that comprises the TX path components. RF signals received via the antenna 303 may be amplified by the LNA 322, and the mixer 324 mixes the amplified RF signals with a receive local oscillator (LO) signal to convert the RF signal of interest to a different baseband frequency (i.e., downconvert). The baseband signals output by the mixer 324 may be filtered by the BBF 326 before being converted by an analog-to-digital converter (ADC) 328 to digital I and/or Q signals for digital signal processing.

Certain transceivers may employ frequency synthesizers with a variable-frequency oscillator (e.g., a voltage-controlled oscillator (VCO) or a digitally controlled oscillator (DCO)) to generate a stable, tunable LO with a particular tuning range. Thus, the transmit LO may be produced by a TX frequency synthesizer 318, which may be buffered or amplified by amplifier 320 before being mixed with the baseband signals in the mixer 312. Similarly, the receive LO may be produced by an RX frequency synthesizer 330, which may be buffered or amplified by amplifier 332 before being mixed with the RF signals in the mixer 324. For certain aspects, a single frequency synthesizer may be used for both the TX path 302 and the RX path 304. In certain aspects, the TX frequency synthesizer 318 and/or the RX frequency synthesizer 330 may include a frequency multiplier, such as a frequency doubler, that is driven by an oscillator (e.g., a VCO) in the frequency synthesizer.

In some aspects, the transceiver front end 300 may include circuitry facilitating analog and/or digital interference cancellation. For example, a coupler may be coupled to an output of the PA 316. The coupler may provide an interference signal to a routing device (e.g., a switch or splitter), which may provide the interference signal to an analog interference cancellation (AIC) circuit, to a digital interference cancellation (DIC) circuit, or both.

A controller (e.g., controller 280 in FIG. 2) may direct the operation of the transceiver front end 300, such as transmitting signals via the TX path 302 and/or receiving signals via the RX path 304. The controller may be a processor, a digital signal processor (DSP), an application-specific integrated circuit (ASIC), a field-programmable gate array (FPGA) or other programmable logic device (PLD), discrete gate or transistor logic, discrete hardware components, or any combination thereof. A memory (e.g., memory 282 in FIG. 2) may store data and/or program codes for operating the transceiver front end 300. The controller and/or the memory may include control logic (e.g., complementary metal-oxide-semiconductor (CMOS) logic).

Example Wireless Transmitter

Traditional cellular communication uses time-division duplexing (TDD) or frequency-division duplexing (FDD). When both low latency (e.g., for downlink (DL)/uplink (UL)) and high bandwidth (e.g., for DL) are important for certain user applications (such as augmented reality (AR), virtual reality (VR), data-intensive gaming, etc.), the network may either not meet latency specifications or may not be able to use resources efficiently (e.g., reducing throughput (TPUT)). For example, ultra-reliable low-latency communication (URLLC) applications may have a less than 1 ms latency specification, which may be violated when the network tends to serve most DL users.

Figure 4:
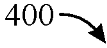
FIG. 4 is a diagram illustrating duplexing techniques.
Figure 4:
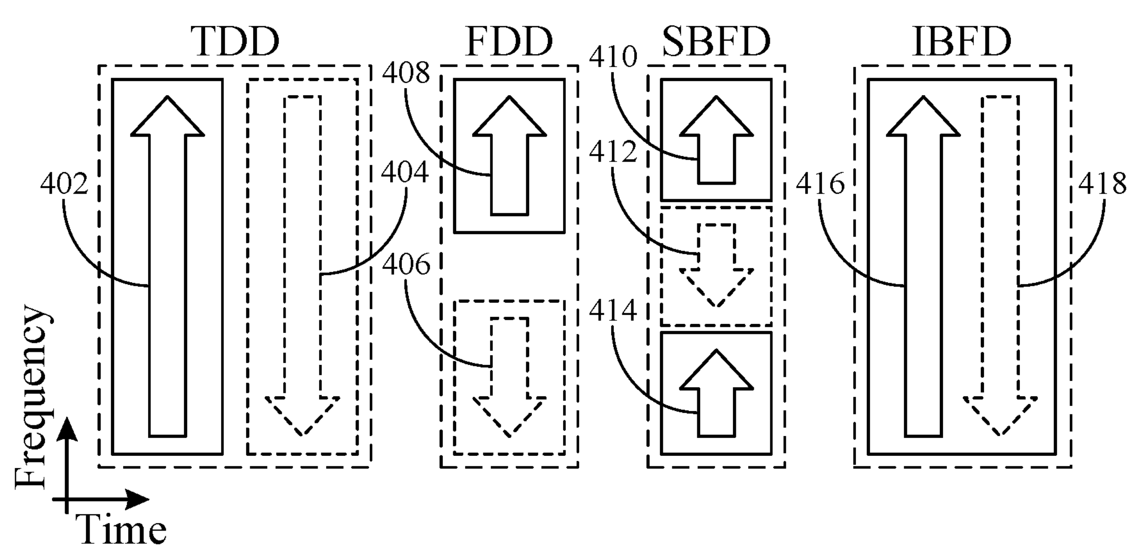

FIG. 4 is a diagram 400 illustrating TDD, FDD, subband full duplex (SBFD), and in-band full duplex (IBFD) in a plot of frequency versus time. As shown, uplink transmission 402 and downlink transmission 404 occur at different times for TDD, using any or all frequencies. For FDD, uplink transmission 408 and downlink transmission 406 occur at the same time using different frequencies. For SBFD, uplink transmissions 410, 414 and downlink transmission 412 occur on different subbands (e.g., different frequency ranges within the full frequency range), but at the same time. For non-overlap SBFD, the uplink and downlink transmissions do not overlap in the frequency domain. For overlap SFBD, the uplink and downlink transmissions overlap in the frequency domain. For IBFD, the uplink transmission 416 and downlink transmission 418 occur at different times but within the same band. For non-overlap and overlap SBFD and for IBFD, antenna, analog, and/or digital interference cancellation may be used to reduce self-interference to an acceptable level. In some cases, antenna isolation may be small due to small user equipment (UE) space. Thus, a filter or duplexer, in addition to analog interference cancellation (AIC), may be used.

Figure 5A:
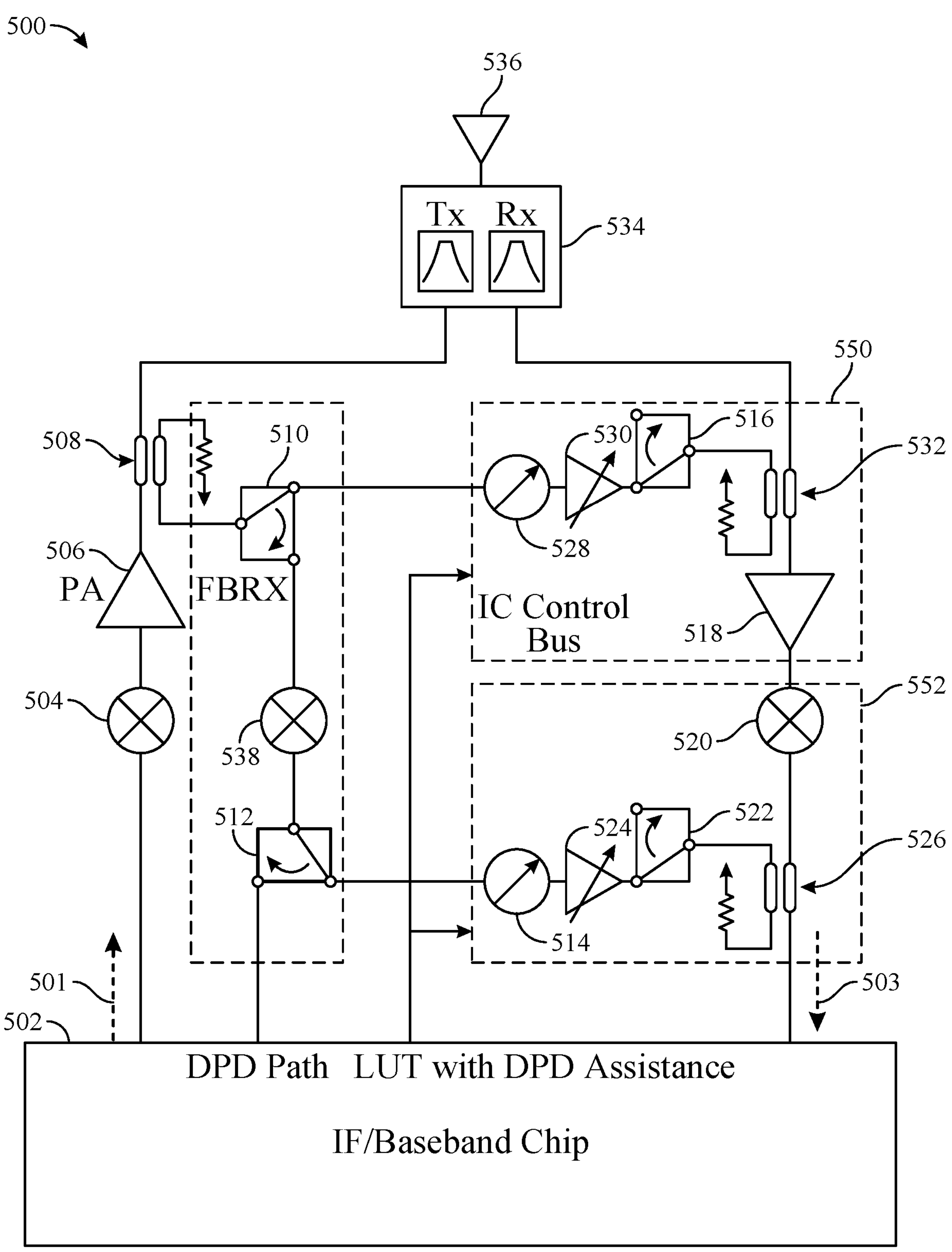
FIG. 5A illustrates a wireless device having a feedback receiver (FBRX) providing closed-loop power control and digital interference cancellation (DIC), in accordance with certain aspects of the present disclosure.

FIG. 5A illustrates a wireless device 500 having a feedback receiver (FBRX) providing closed-loop power control and digital interference cancellation (DIC), in accordance with certain aspects of the present disclosure. The FBRX may be used for SBFD applications to reduce channel complexity and design cost. In some aspects, analog transmitter (Tx) interference reduction may be performed at radio frequency (RF), intermediate frequency (IF), or baseband in a dynamic manner.

The device 500 may include a transceiver chip 502 (e.g., including modems and processors) with a Tx port coupled to a transmit chain 501. The transmit chain 501 may include a mixer 504 (e.g., corresponding to mixer 312 of FIG. 3) and power amplifier (PA) 506 (e.g., corresponding to PA 316) for signal transmission via antenna 536 through a duplexer 534 (e.g., corresponding to interface 306). As shown, the antenna 536 may be coupled, through the duplexer 534, to a low-noise amplifier (LNA) 518 of a receive chain 503 for reception. The output of the LNA 518 may be at RF, which may be downconverted by mixer 520 to IF or BB frequency, as shown. As shown, the downconverted signal may be provided to the chip 502 for processing.

The device 500 may include an FBRX path implemented with a signal coupler 508 (also referred to as a "directional coupler" and herein as a "coupler") coupled to the output of the PA 506. The coupler 508 may provide a signal (e.g., corresponding to the output signal of PA 506) to a routing device 510 (e.g., switch or a splitter). The routing device 510 may be a single pole, double throw (SPDT) switch configured to selectively couple an output of the coupler 508 to an input of an RF AIC and LNA circuit 550 or to an input of a mixer 538. As shown, the output of mixer 538 may be coupled to another routing device 512. The routing device 512 may be an SPDT switch configured to selectively couple an output of the mixer 538 to a DIC circuit (e.g., a DPD path of the chip 502) or to an input of an IF or BB AIC and mixer circuit 552, as shown.

The circuit 550 may include a phase shifter 528 for phase adjustment coupled to an amplifier 530 for gain (magnitude) adjustment. As shown, the phase shifter 528 and the amplifier 530 may be configurable (e.g., tunable) to adjust the phase and/or the gain of the input signal. The output of the amplifier 530 may be coupled to a coupler 532 (e.g., through switch 516). The coupler 532 may electrically couple an interference cancellation signal to an input of the LNA 518, as shown. Thus, the circuit 550 provides for interference cancellation, or at least reduction, in the RF domain. As used herein, an AIC circuit may refer to a phase shifter (e.g., phase shifter 528) and/or amplifier (e.g., amplifier 530) coupled to a receive path (e.g., via a coupler such as coupler 532).

Similarly, the circuit 552 may include a phase shifter 514 for phase adjustment coupled to an amplifier 524 for gain (magnitude) adjustment. As shown, the output of the amplifier 524 may be coupled to a coupler 526 (e.g., through a switch 522). The coupler 526 may couple an interference cancellation signal to an output of the mixer 520, as shown. Thus, the circuit 552 provides for interference cancellation, or at least reduction, in the IF or BB domain. In some cases, the interference cancellation chain (e.g., circuit 552) may be integrated with an Rx chip (e.g., chip 502) to reduce part count. In some cases, for multi-path interference cancellation or wide bandwidth (BW) interference cancellation, a multi-tap AIC circuit may be implemented, as described in more detail herein. In SBFD/IBFD operation, a DPD algorithm (e.g., for an asymmetrical adjacent channel leakage ratio (ACLR)) and closed-loop power control may be used for power leakage reduction and tap count reduction for AIC power and cost-effectiveness and to maintain high duplex throughput.

Figure 5B:
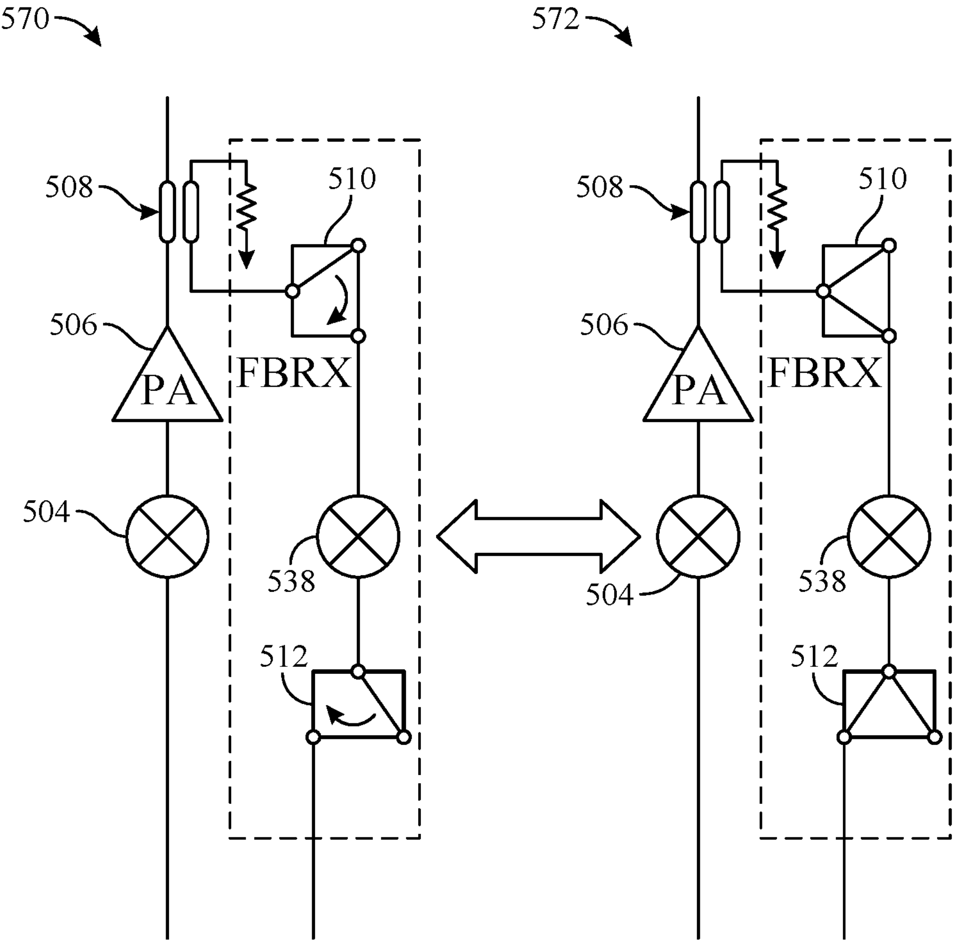
FIG. 5B illustrates an FBRX implemented with a switch or a splitter, in accordance with certain aspects of the present disclosure.

FIG. 5B illustrates an FBRX implemented with a switch or a splitter, in accordance with certain aspects of the present disclosure. For example, the routing device 510 and/or routing device 512 may each be implemented as a switch, as shown in diagram 570, or as a splitter, as shown in diagram 572. When implemented as a splitter, the coupled signal from coupler 508 may be routed for AIC and DPD. That is, using splitters adds the flexibility to support both AIC (in the RF, IF, or BB domain) and digital interference cancellation (DIC) (e.g., for linear interference cancellation (LIC) and non-linear interference cancellation (NLIC)), which may help meet a system total interference cancellation specification, as well as DPD/closed-loop power control (CLPC). If both routing device 510 and routing device 512 are switches, the device 500 may provide AIC (in the RF, IF, or BB domain) or DPD/DIC. If the routing device 510 is a splitter and the routing device 512 is a switch, the device 500 may provide AIC in the RF domain and AIC in the IF or BB domain or DPD/DIC. If the routing device 510 is a switch and the routing device 512 is a splitter, the device 500 may provide AIC in the RF domain or AIC in the IF or BB domain and DPD/DIC. If both routing device 510 and routing device 512 are splitters, the device 500 provides AIC in the RF domain, AIC in the IF or BB domain, and DPD/DIC.

Figure 6:
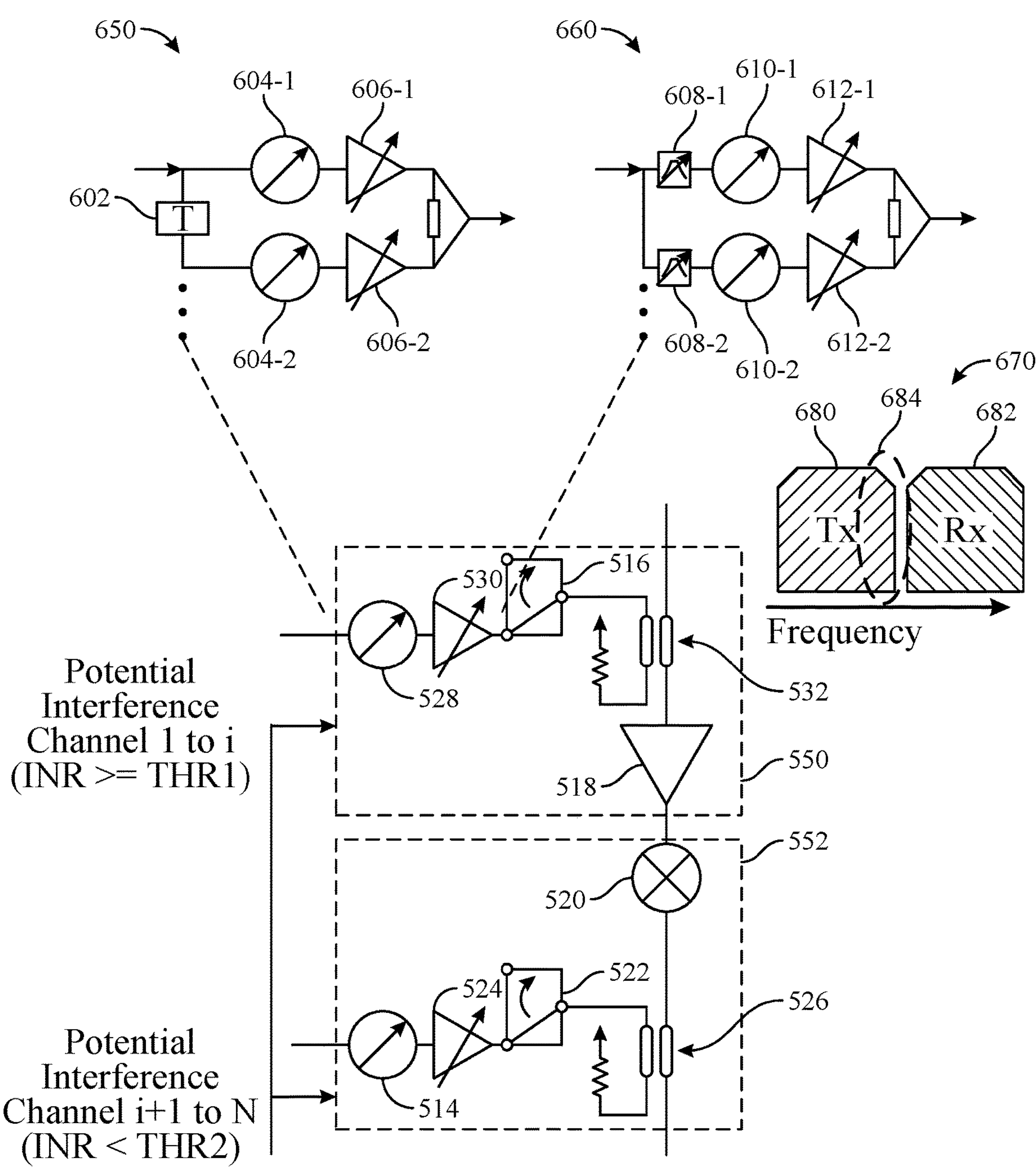
FIG. 6 illustrates multi-delay or multi-subband filter analog interference cancellation (AIC), in accordance with certain aspects of the present disclosure.

FIG. 6 illustrates multi-delay or multi-subband filter AIC, in accordance with certain aspects of the present disclosure. As shown, the phase shifter and amplifier of the circuit 550 (and/or circuit 552) may be replaced with multiple phase and gain adjustment paths. For example, the AIC circuit may be implemented with a time delay AIC circuit 650 which may include phase shifters 604-1, 604-2 with a time delay element 602 coupled between the inputs of the phase shifters. The output of each phase shifter 604-1, 604-2 may be coupled to an input of an amplifier 606-1, 606-2, respectively. The outputs of the amplifiers 606-1, 606-2 may be combined and coupled to the coupler 532 (or coupler 526). While only two branchs are shown, the AIC may include multiple (e.g., N branches, N being a positive integer) of such parallel time-delayed phase shifter and amplifier branchs before a combiner. The number of branches may depend on both data characteristics (e.g., waveform, bandwidth) and RF circuitry design. In some cases, the AIC circuit may be implemented with a subband filter AIC circuit 660 which may include phase shifters 610-1, 610-2 with subband filters 608-1, 608-2 coupled to inputs of respective phase shifters. The output of each phase shifter may be coupled to an input of a respective amplifier 612-1, 612-2. The outputs of the amplifiers 612-1, 612-2 may be combined and coupled to the coupler 532 (or coupler 526). While two phase and gain adjustment paths are shown for the AIC circuits 650, 660, any number of paths (N) may be used. In some cases, the AIC circuit may be implemented with both time delay and subband filters.

The AIC with subband filters (or time delay) allows for wideband (or longer duration) AIC. For example, subband filters may be configurable, allowing AIC to be performed for specific subbands or resource blocks, which may be dynamically selected. In some cases, AIC may be configured using baseband data or information. However, using only baseband data may be time-consuming as loop-back calibration may be performed to determine the phase and amplitude for each delay/subband path. In some cases, an online calibration procedure may have to be performed, reducing throughput.

Some aspects of the present disclosure are directed to AIC with DPD assistance. For example, a look-up table (LUT) may be used with DPD assistance to set a configuration for each of the delay/subband paths of the AIC circuits, decreasing operation delay and increasing throughput (e.g., since a factory calibration used to generate the LUT is used). For instance, based on the feedback provided to the DPD path (e.g., through routing device 510, mixer 538, and routing device 512, a setting may be selected for the AIC phase shifters (e.g., phase shifter 528) and amplifiers (e.g., amplifier 530) of the circuit 550 and/or circuit 552. In a factory test, additional calibration may be carried out via a main Rx path on (e.g., using routing device 510, phase shifter 528, amplifier 530, switch 516, coupler 532, LNA 518, and mixer 520 or using routing device 510, mixer 538, routing device 512, phase shifter 514, amplifier 524, switch 522, and coupler 526) to achieve a more accurate interference channel characteris for SBFD/IBFD operation.

Some transmission waveforms may use a few resource blocks (RBs) to hundreds of RBs for communication. Based on the feedback to the DPD path, the transmission spread across a system bandwidth may be identified and used to configure the AIC circuits to perform interference cancellation more efficiently. For example, a subset of the subband paths of the AIC circuit 660 may be selected (e.g., for a particular waveform and/or based on the feedback to the DPD path). In some aspects, the AIC circuits may be controlled based on an interference-to-Rx-noise-floor ratio (INR). For example, if the INR is greater than or equal to a first threshold (THR1), then AIC may be performed using circuit 550 in the RF domain. If the INR is less than a second threshold (THR2), then AIC may be performed using circuit 552 in the IF or BB domain. THR1 may be the same as THR2, in some aspects. In some aspects, RF-domain AIC may be performed for a first subset of channels (e.g., channels 1 to i, i being a positive integer), and IF- or BB-domain AIC may be performed for a second subset of channels (e.g., channels i+1 to N, N being an integer greater than 1).

In some aspects, the AIC in the RF domain (or in the IF or BB domain) may be used to reduce interference associated with a transmit side of a band closest in the frequency domain to the receive band. Diagram 670 shows a Tx band 680 and a Rx band 682 for SFBD operation. A sideband 684 of the Tx band 680 may be closest to the Rx band 682 in the frequency domain. Thus, the AIC circuits may be used to reduce interference associated with sideband 684. For example, the filters 608-1, 608-2 may be configured to provide interference cancellation for the sideband 684. In some aspects, the device 500 may be used to negotiate with the network to perform Tx power back off (e.g., or relocate RB resources) to accommodate duplex operations.

Figure 7:
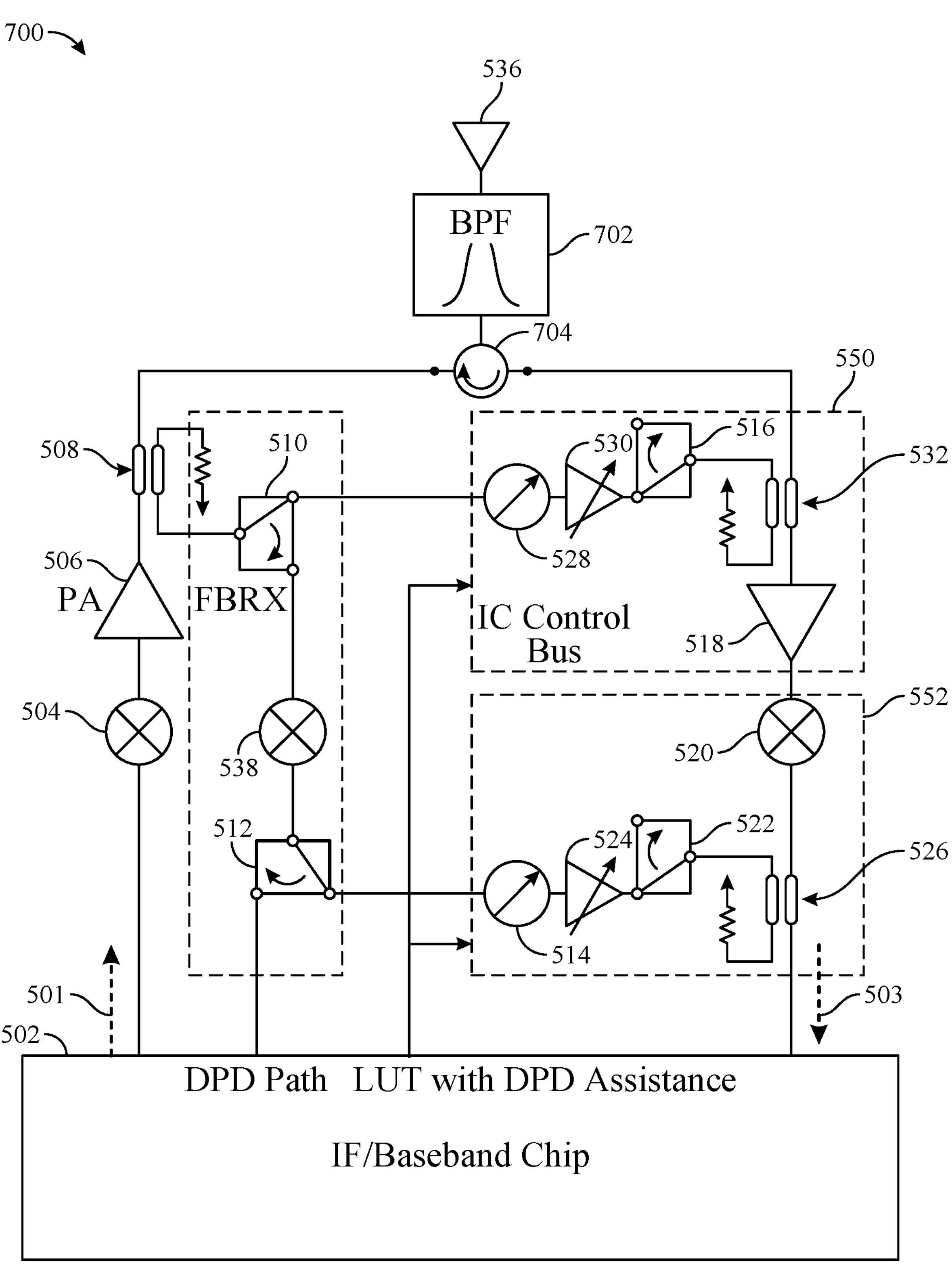
FIG. 7 illustrates a wireless device implemented with a circulator and a filter, in accordance with certain aspects of the present disclosure.

FIG. 7 illustrates a wireless device 700 implemented with a circulator 704 and a filter 702, in accordance with certain aspects of the present disclosure. As shown, instead of using the duplexer 534 shown in FIG. 5A, the wireless device 700 may include a circulator 704 coupled to an output of PA 506 and input of LNA 518. A filter 702 (e.g., band-pass filter (BPF)) may be coupled between the antenna 536 and the circulator 704. Using a circulator instead of a duplexer may allow for not using a guard band between Tx and Rx bands for SBFD (or IBFD). Using the circulator may also provide flexibility in selecting the Tx and Rx bands. In some aspects, the circulator may be replaced with a hybrid transformer circuit.

Figure 8:
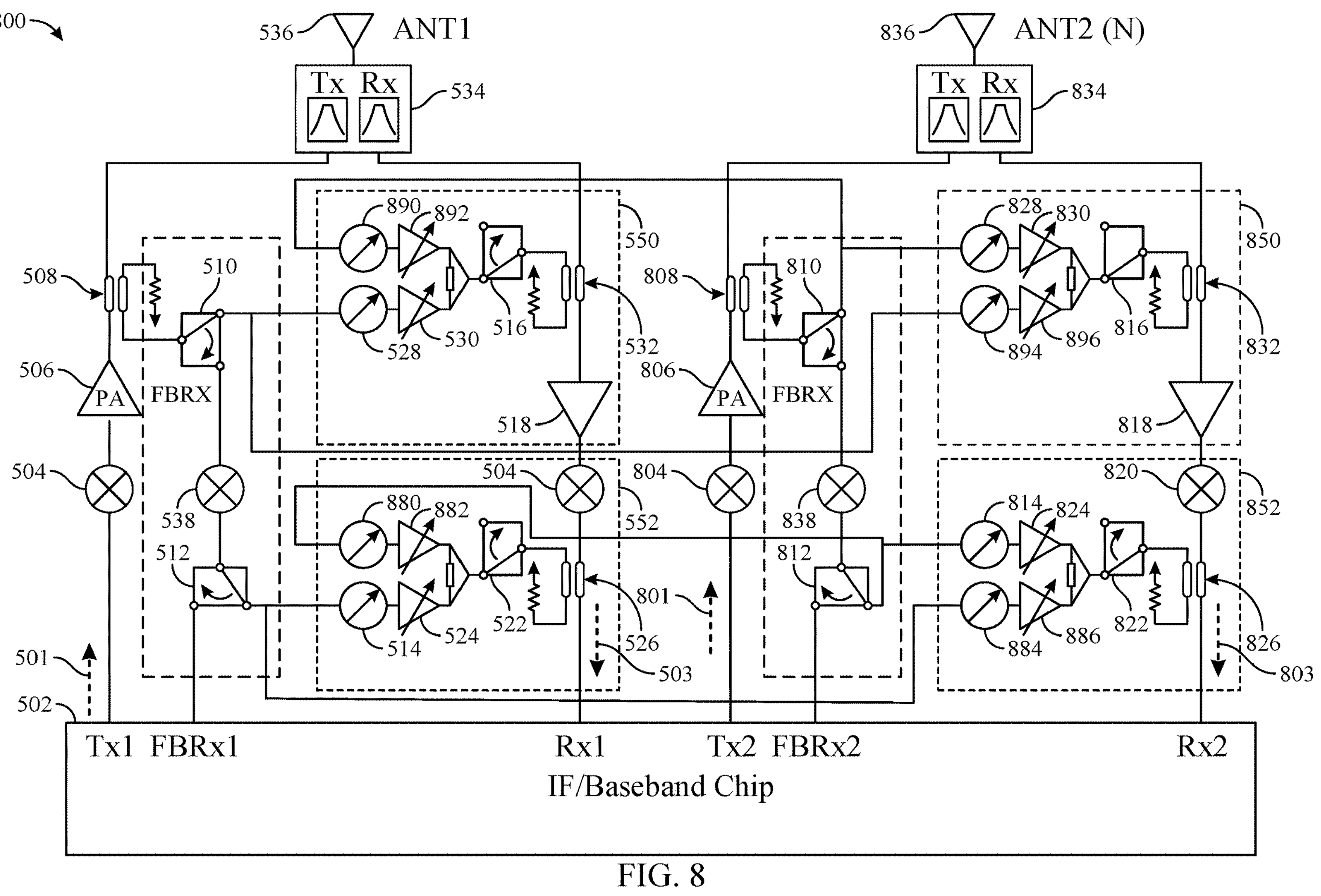
FIG. 8 illustrates a wireless device implemented for multiple-input multiple-output (MIMO) transmission, in accordance with certain aspects of the present disclosure.

FIG. 8 illustrates a wireless device 800 implemented for MIMO transmission, in accordance with certain aspects of the present disclosure. As shown, the wireless device 800 may be implemented with two antennas, each coupled to a receive chain and transmit chain. However, certain aspects of the present disclosure may be applied to any number of antennas. As shown, the device 800 may include a transmit chain 801 including a mixer 804 (e.g., corresponding to mixer 312 of FIG. 3) and PA 806 (e.g., corresponding to PA 316) for signal transmission via antenna 836 through a duplexer 834 (e.g., corresponding to interface 306). The antenna 836 may be coupled to an LNA 818 for reception. The output of the LNA 818 may be at RF, which may be downconverted by mixer 820 to an IF or BB frequency, as shown. As shown, the downconverted signal may be provided to the chip 502 for processing.

The device 800 may include an FBRX path implemented with a signal coupler 808 coupled to the output of the PA 806. The coupler 808 may provide a signal (e.g., corresponding to the output signal of PA 806) to a routing device 810 (e.g., switch or splitter). The routing device 810 may be a SPDT switch configured to selectively couple an output of the coupler 808 to an input of an RF AIC and LNA circuit 850 or an input of a mixer 838. As shown, the output of mixer 838 may be coupled to a routing device 812. The routing device 812 may be an SPDT switch configured to selectively couple an output of the mixer 838 to a DPD path of the chip 502 or to an input of an IF or BB AIC and mixer circuit 852, as shown. The circuit 850 may include a phase shifter 828 for phase adjustment coupled to an amplifier 830 for gain (magnitude) adjustment. As shown, the output of the amplifier 830 may be coupled to a coupler 832 (e.g., through switch 816). The coupler 832 may couple an interference cancellation signal to an input of the LNA 818, as shown. Thus, the circuit 850 provides for interference cancellation in the RF domain.

In some aspects, the signal coupled from the output of the PA 506 (associated with the antenna 536 antenna labeled "ANT1") via the routing device 510 may be provided to circuit 850 (e.g., provided to phase shifter 894 and amplifier 896 coupled to coupler 832) for AIC in the RF domain at the receive path 803 (associated with the antenna 836 labeled "ANT2"). The signal coupled from the output of the PA 806 (associated with ANT2) via the routing device 810 may be provided to circuit 550 (e.g., provided to phase shifter 890 and amplifier 892 coupled to coupler 532) for AIC in the RF domain at the receive path 503 associated with ANT1. Similarly, the signal coupled from the output of the mixer 538 may be provided to circuit 852 (e.g., provided to phase shifter 884 and amplifier 886 coupled to coupler 826) for AIC in the IF or BB domain at the receive path 803 associated with ANT2, and the signal from the output of the mixer 838 may be provided to circuit 552 (e.g., provided to phase shifter 880 and amplifier 882 coupled to coupler 526) for AIC in the IF or BB domain at the receive path 503 associated with ANT1. The signal from the output of the mixer 838 may be provided to phase shifter 814 coupled to amplifier 824 for phase and gain adjustment for interference cancellation via coupler 826 and through switch 822. In this manner, interference between antennas (e.g., antennas ANT1 and ANT2) may be reduced.

Figure 9:
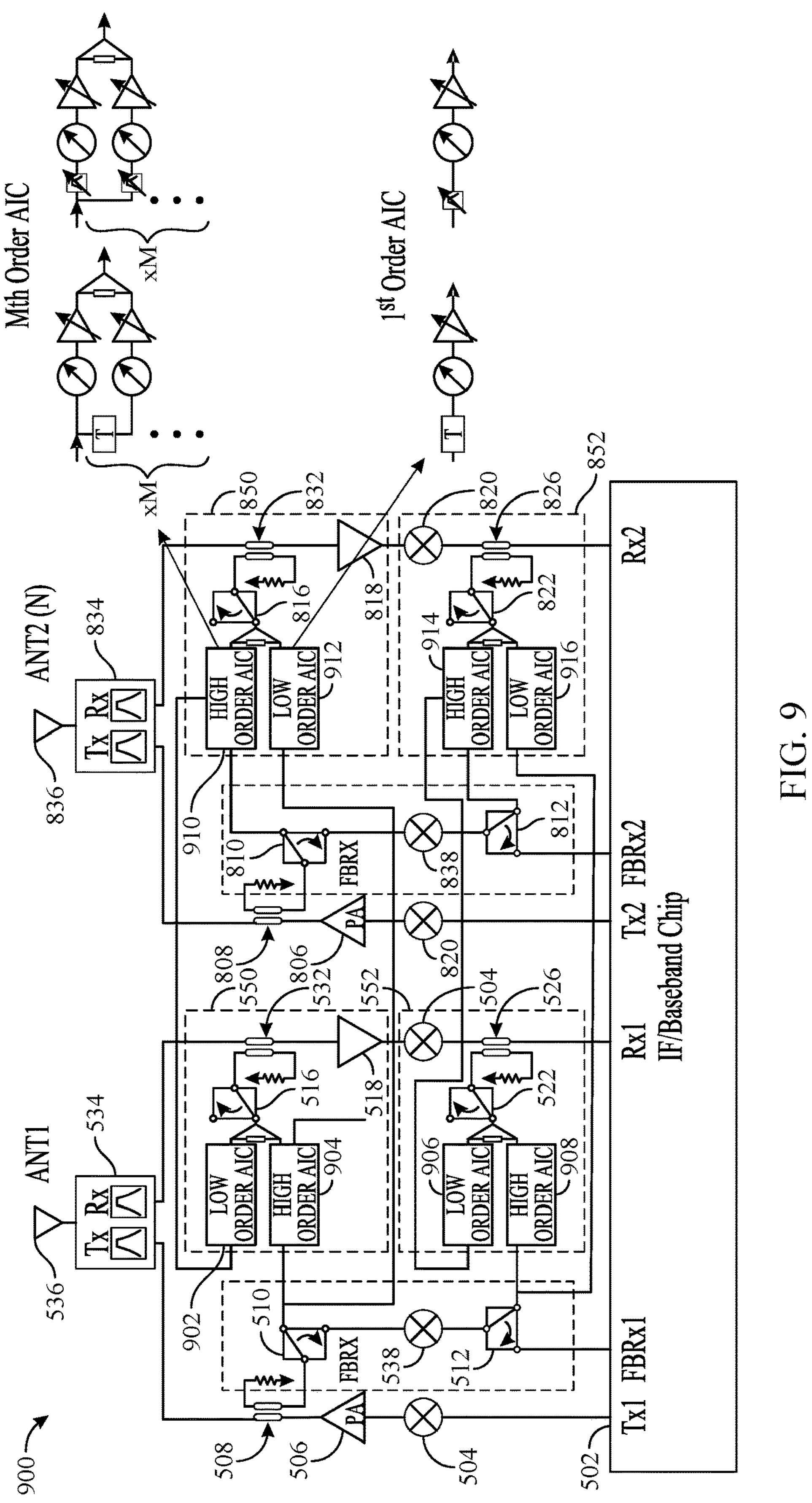
FIG. 9 illustrates a wireless device implemented with low and high-order AICs, in accordance with certain aspects of the present disclosure.

FIG. 9 illustrates a wireless device 900 implemented with low- and high-order AICs, in accordance with certain aspects of the present disclosure. As shown, the signal coupled from the output of the PA 506 (associated with ANT1) via the routing device 510 may be provided to a high-order AIC circuit 904 for interference cancellation via coupler 532. The signal coupled from the output of the PA 506 via the routing device 510 may also be provided to a low-order AIC circuit 912 to be used for interference cancellation via coupler 832 at the input of LNA 818 associated with ANT2. The interference signal from routing device 510 may be provided to circuit 850 to reduce the effect of cross-antenna interference. To reduce the interference associated with coupling between antennas (ANT1 and ANT2), a low-order AIC circuit may be used since the cross-antenna interference may have a flatter frequency response (e.g., as compared to interference from a transmit chain to a receive chain associated with the same antenna). Alternatively, a high-order AIC circuit could be used in place of the low-order AIC circuit 912, or any of the other low-order AIC circuits, shown in the example of FIG. 9 or otherwise.

Similarly, the signal coupled from the output of the PA 806 (associated with ANT2) via the routing device 810 may be provided to a high-order AIC circuit 910 for interference cancellation via coupler 832. The signal coupled from the output of the PA 806 via the routing device 810 may also be provided to a low-order AIC circuit 902 to be used for interference cancellation via coupler 532 at the input of LNA 518 associated with ANT1. In this manner, when transmitting and receiving via ANT1 and ANT2, interference cancellation may be performed for both receptions at ANT1 and ANT2.

A similar architecture with high- and low-order AIC circuits may be implemented in the IF or BB domain. For example, the signal coupled from the output of the mixer 538 may be provided to a high-order AIC circuit 908 for interference cancellation via coupler 526. The signal from the output of the mixer 538 may also be provided to a low-order AIC circuit 916 to be used for interference cancellation via coupler 826 at the output of mixer 820 associated with ANT2 in the IF or BB domain. Similarly, the signal from the output of the mixer 838 may be provided to a high-order AIC circuit 914 for interference cancellation via coupler 826. The signal from the output of the mixer 838 may also be provided to a low-order AIC circuit 906 to be used for interference cancellation via coupler 526 at the output of mixer 504.

As shown, a high-order AIC circuit may include multiple phase and gain adjustment paths (e.g., an $M^{th}$-order AIC circuit may include M paths, M being an integer greater than 1) with each path including a subband filter or with delay elements between paths, as shown in FIG. 9 and described with respect to FIG. 6. A low-order AIC circuit (e.g., a $1^{st}$-order AIC circuit) may include fewer phase and gain adjustment paths (such as a single phase and gain adjustment path with a delay element and/or filter, as shown, in the case of a $1^{st}$-order AIC circuit). Similarly, lower or higher order AIC may be implemented in the frequency domain with subband filters. The AIC order is associated with the total number of subband filters. The higher the order, the smaller the bandwidth in each filter.

Figure 10:
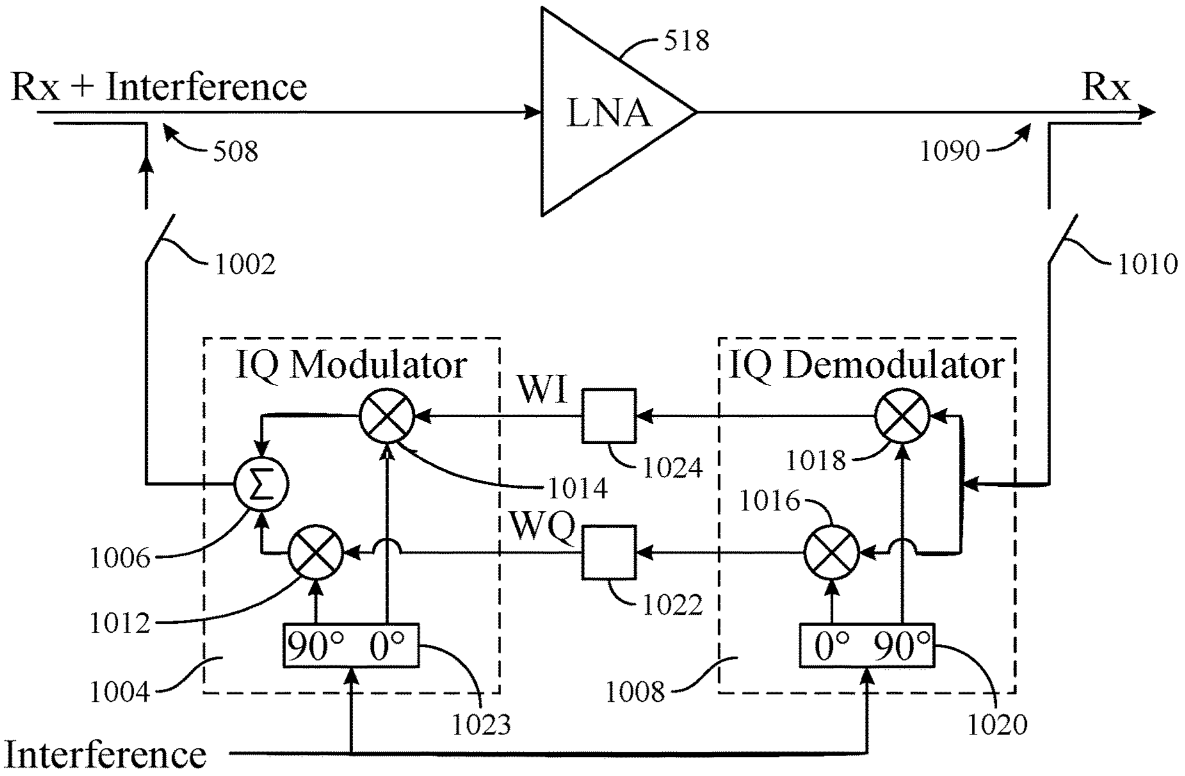
FIG. 10 illustrates a receive path implemented with closed-loop interference cancellation, in accordance with certain aspects of the present disclosure.

FIG. 10 illustrates a receive path implemented with closed-loop interference cancellation, in accordance with certain aspects of the present disclosure. As shown, the wireless device may include an in-phase (I) and quadrature (Q) demodulator (IQ demodulator) 1008 which may be selectively coupled to an output of the LNA 518 via a switch 1010. As shown, a coupler 1090 may be coupled to an output of the LNA 518, providing a signal representing the LNA output signal. The demodulator 1008 may include a phase shifter 1020 that receives an interference signal (e.g., signal from coupler 508 through routing device 510). The interference signal may be mixed with the LNA output signal via a mixer 1018 and a phase shifted interference signal (e.g., phase shifted by 90° via phase shifter 1020) may be mixed with the LNA output signal via a mixer 1016. The I and Q signals (e.g., from respective mixers 1018, 1016) may be provided to respective weight adjustment components (e.g., amplifiers) 1022, 1024. The weight-adjusted I and Q signals may be provided to an IQ modulator 1004. The modulator 1004 may include a phase shifter 1023. The weight-adjusted I signal may be mixed with the interference signal via mixer 1014, and the weight-adjusted Q signal may be mixed with a phase shifted interference signal (e.g., phase shifted by 90° via phase shifter 1023) via mixer 1012, and combined using combiner 1006 to be fed back to the input of the LNA 518 through switch 1002 and negative feedback coupler 508 for closed-loop interference cancellation, as shown. The weight adjustment may be used to compensate the gain difference between the interference signal through the FBRx path and interference signal from the Rx chain (e.g., at input of LNA 518 from the antenna), as well as the additional gain provided by the LNA 518.

The greater the interference at the output of the LNA 518, the greater the correlation between the interference at the output of LNA 518 and the respective I and Q interference signals. Thus, the demodulator I and Q output signals may be positive and amplified based on respective weights, then modulated via modulator 1004, combined, and fed back to the input of the LNA to cancel the interference at the LNA input. As the interference is reduced at the output of the LNA, the correlation between the interference at the LNA output signal and the I and Q interference signals is reduced, decreasing the signal fed back to the input of the LNA for interference cancellation, providing closed-loop interference cancellation. The weights (e.g., gains) associated with the weight components may be selected during calibration. While interference cancellation is shown for a Cartesian transceiver (e.g., with I and Q signals), certain aspects of the present disclosure may be applied to the use of polar transceivers. For a polar transceiver, instead of I and Q demodulation, the LNA output signal may be demodulated into amplitude and phase components, provided to respective weight components (e.g., including phase and gain adjustment), then modulated, combined, and fed back to the input of the LNA 518. The AIC circuitry described herein may be integrated as part of the Rx chip (e.g., chip 502), in some aspects.

Figure 11:
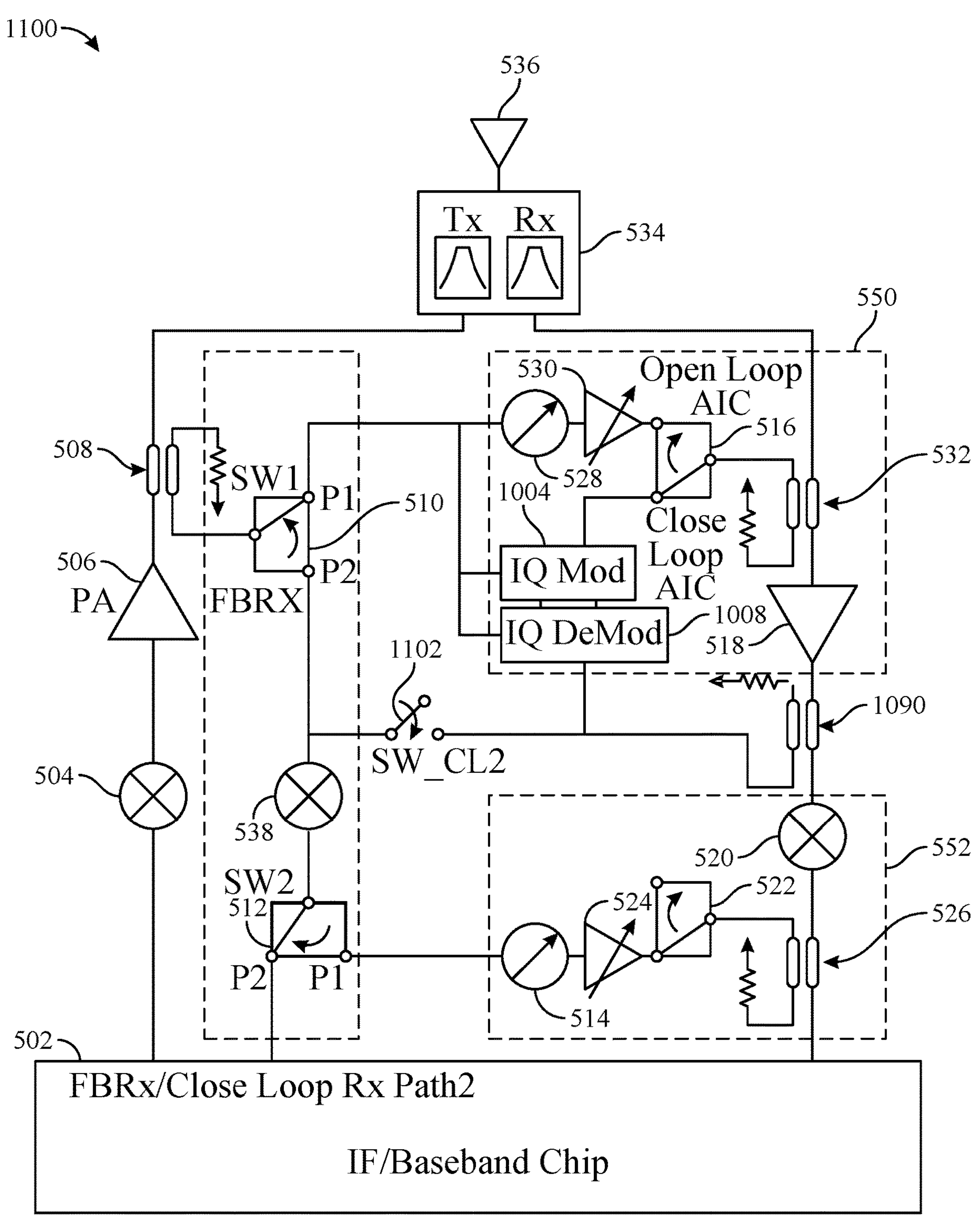
FIG. 11 illustrates a wireless device implemented with dynamic open and closed-loop interference cancellation, in accordance with certain aspects of the present disclosure.

FIG. 11 illustrates a wireless device 1100 implemented with dynamic open- and closed-loop interference cancellation, in accordance with certain aspects of the present disclosure. As shown, the switch 516 may be coupled between the output of the modulator 1004 and the coupler 532, providing closed-loop interference control as described with respect to FIG. 10. In some aspects, the switch 516 may couple the output of the amplifier 530 to the coupler 532, providing open-loop interference control as described with respect to FIG. 5A.

In some aspects, a switch 1102 may be coupled between the coupler 1090 and the input of the mixer 538. When the switch 1102 is closed, closed-loop interference cancellation may be performed in the digital domain. For example, the signal from the coupler 1090 (e.g., representing the LNA output signal) may be downconverted via mixer 538 and fed back to the chip 502, which may be used to control the phase shifter 528 and amplifier 530 for interference cancellation. The path from the coupler 1090 to the chip 502 through switch 1102 may be used to for closed-loop control in a baseband DSP (e.g., chip 502), and/or in some aspects, used to support factory and online calibration with better accuracy.

Figure 12:
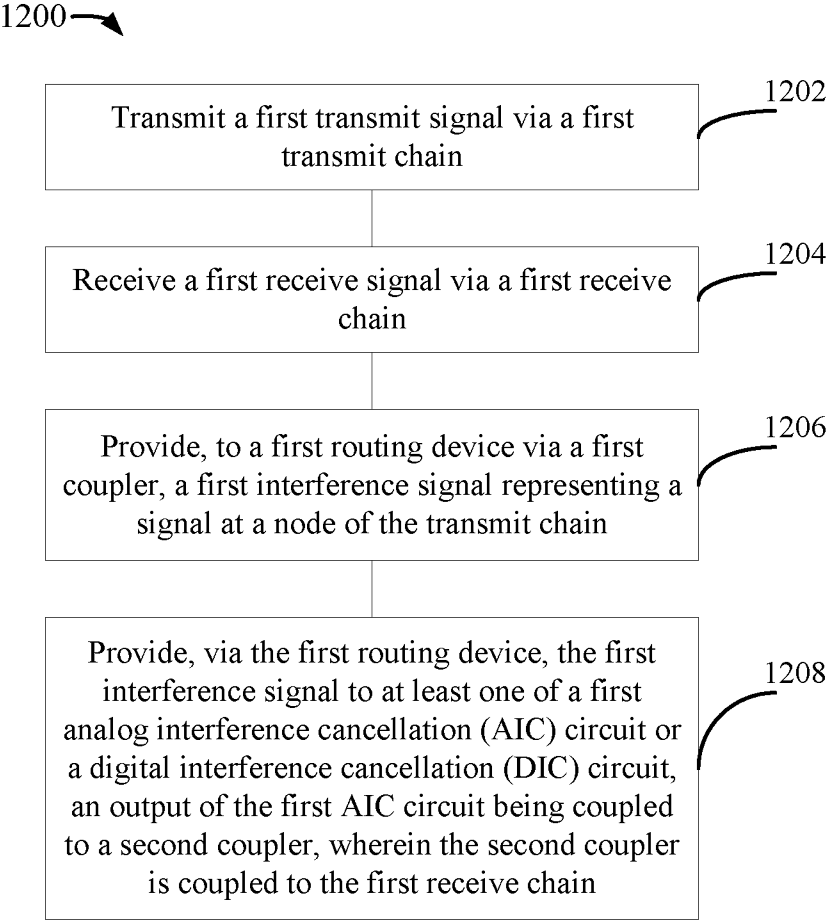
FIG. 12 is a flow diagram illustrating example operations for wireless communication, in accordance with certain aspects of the present disclosure.

FIG. 12 is a flow diagram illustrating example operations 1200 for wireless communication, in accordance with certain aspects of the present disclosure. The operations 1200 may be performed by a wireless device, such as the wireless device 500, 700, 800, 900, or 1100.

At block 1202, the wireless device transmits a first transmit signal via a first transmit chain (e.g., transmit chain 501 of FIG. 5A). At block 1204, the wireless device receives a first receive signal via a first receive chain (e.g., receive chain 503).

At block 1206, the wireless device provides, via a first coupler (e.g., coupler 508), a first interference signal representing a signal at a node of the transmit chain to a first routing device (e.g., routing device 510 or routing device 512). The first coupler may be coupled to the first transmit chain. That is, a portion of the first coupler may be part of the first transmit chain, whereas another portion of the first coupler may be electromagnetically coupled to the first transmit chain.

At block 1208, the wireless device provides, via the first routing device, the first interference signal to at least one of a first AIC circuit (e.g., circuit 550 or circuit 552) or a DIC circuit (e.g., chip 502 for DIC), an output of the first AIC circuit being coupled to a second coupler (e.g., coupler 532 or coupler 526). The second coupler may be coupled to the first receive chain. That is, a portion of the second coupler may be electromagnetically coupled to the first receive chain, whereas another portion of the second coupler may be part of the first receive chain.

In some aspects, the first interference signal is provided to the first AIC circuit. The wireless device processes, via the first AIC circuit, the first interference signal from the first routing device to yield an interference reduction signal (e.g., as generated via phase shifter 528 and amplifier 530). The wireless device provides, via the second coupler (e.g., coupler 532), the interference reduction signal to an input of an amplifier (e.g., LNA 518) of the first receive chain.

In some aspects, the wireless device may downconvert, via a mixer (e.g. mixer 538), the first interference signal to yield a downconverted interference signal. The wireless device may provide, via a second routing device (e.g., routing device 512), the downconverted interference signal to at least one of a second AIC circuit (e.g., circuit 552) or the DIC circuit. An output of the second AIC circuit may be coupled to a third coupler (e.g., coupler 526). The third coupler may be coupled to the first receive chain. That is, a portion of the third coupler may be electromagnetically coupled to the first receive chain, whereas another portion of the third coupler may be part of the first receive chain.

In some aspects, the wireless device may generate, via an amplifier (e.g., LNA 518) of the first receive chain, an amplified receive signal. The wireless device may demodulate, via a demodulator (e.g., demodulator 1008) of the first AIC circuit, the amplified receive signal based on the first interference signal to yield demodulated signals. The wireless device may modulate, via a modulator (e.g., modulator 1004) of the first AIC circuit, the demodulated signals based on the first interference signal to yield a modulated signal. The wireless device may provide the modulated signal to an input of the amplifier.

In some aspects, the wireless device may transmit a second transmit signal via a second transmit chain (e.g., transmit chain 801 of FIG. 8). The wireless device may receive a second receive signal via a second receive chain (e.g., receive chain 803). The wireless device may provide, via a third coupler (e.g., coupler 808), a second interference signal representing a signal at a node of the second transmit chain to a second routing device (e.g., routing device 810 or routing device 812). The wireless device may provide, via the second routing device, the second interference signal to at least one of a second AIC circuit (e.g., circuit 850 or circuit 852) or the DIC circuit (e.g., chip 502). An output of the second AIC circuit may be coupled to a fourth coupler (e.g., coupler 832 or coupler 826). The fourth coupler may be coupled to or part of the second receive chain. In some aspects, the wireless device may provide, via the first routing device, the first interference signal to the second AIC circuit and provide, via the second routing device, the second interference signal to the first AIC circuit.

Example Aspects

Aspect 1: An apparatus for wireless communication, comprising: a first transmit chain; a first receive chain; a first coupler coupled to the first transmit chain; a second coupler coupled to the first receive chain; a first analog interference cancellation (AIC) circuit having an input coupled to the first coupler and an output coupled to the first receive chain via the second coupler; and a first routing device coupled between the first coupler and the input of the first AIC circuit, the first routing device being further coupled between the first coupler and a digital interference cancellation (DIC) circuit.

Aspect 2: The apparatus of Aspect 1, wherein the output of the first AIC circuit is coupled to an input of an amplifier of the first receive chain.

Aspect 3: The apparatus of Aspect 1 or 2, further comprising: a second AIC circuit, wherein the first receive chain comprises an amplifier and a first mixer having an input coupled to an output of the amplifier and wherein the second AIC circuit has an output coupled to an output of the first mixer; a second mixer having an input coupled to the first routing device; and a second routing device coupled between an output of the second mixer and an input of the second AIC circuit, wherein the second routing device is further coupled between the output of the second mixer and the DIC circuit.

Aspect 4: The apparatus of Aspect 3, wherein the first AIC circuit is configured to perform interference cancellation for a first subset of channels, and wherein the second AIC circuit is configured to perform interference cancellation for a second subset of channels.

Aspect 5: The apparatus of Aspect 3 or 4, wherein the first AIC circuit is configured to perform interference cancellation based on an interference-to-receiver-noise-floor ratio being greater than or equal to a first threshold, and wherein the second AIC circuit is configured to perform interference cancellation based on the interference-to-receiver-noise-floor ratio being less than a second threshold.

Aspect 6: The apparatus according to any of Aspects 1-5, further comprising a duplexer or a circulator coupled between the first transmit chain and the first receive chain.

Aspect 7: The apparatus according to any of Aspects 1-6, wherein the first routing device comprises a switch or a splitter.

Aspect 8: The apparatus according to any of Aspects 1-7, where the first AIC circuit comprises a first AIC path having at least one of a first phase shifter or a first amplifier.

Aspect 9: The apparatus of Aspect 8, wherein the first AIC circuit comprises a second AIC path in parallel with the first AIC path, the second AIC path having at least one of a second phase shifter or a second amplifier.

Aspect 10: The apparatus of Aspect 9, wherein the first AIC circuit comprises a delay element coupled between the first AIC path and the second AIC path.

Aspect 11: The apparatus of Aspect 9 or 10, wherein: the first AIC path comprises a first subband filter; and the second AIC path comprises a second subband filter.

Aspect 12: The apparatus of Aspect 11, wherein at least one of the first subband filter or the second subband filter is configured to filter a signal at the input of the first AIC circuit based on a transmission waveform.

Aspect 13: The apparatus according to any of Aspects 1-12, wherein: the first routing device is configured to provide a signal from the first coupler to the DIC circuit; and the DIC circuit is configured to: process the signal from the first coupler for digital predistortion (DPD); and control the first AIC circuit based on the processing.

Aspect 14: The apparatus according to any of Aspects 1-13, wherein the first transmit chain is coupled to a first antenna interface, and wherein the first receive chain is coupled to a second antenna interface different than the first antenna interface.

Aspect 15: The apparatus according to any of Aspects 1-14, wherein the first receive chain comprises an amplifier and wherein the first AIC circuit comprises: a third coupler coupled to an output of the amplifier of the first receive chain; a demodulator having inputs coupled to the third coupler and the first routing device; and a modulator having inputs coupled to outputs of the demodulator and the first routing device, wherein an output of the modulator is coupled to the second coupler.

Aspect 16: The apparatus of Aspect 15, further comprising weight adjustment components coupled to the outputs of the demodulator.

Aspect 17: The apparatus according to any of Aspects 1-16, further comprising a third coupler, wherein the first receive chain comprises an amplifier and wherein the third coupler is coupled to an output of the amplifier and to the DIC circuit.

Aspect 18: The apparatus of Aspect 17, further comprising a switch coupled between the third coupler and the DIC circuit.

Aspect 19: The apparatus according to any of Aspects 1-18, wherein the first AIC circuit comprises a first interference cancellation (IC) path and a second IC path, and wherein at least one of a delay element or a filter is coupled between inputs of the first IC path and the second IC path.

Aspect 20: The apparatus according to any of Aspects 1-19, further comprising: a second transmit chain; a second receive chain; a third coupler coupled to the second transmit chain; a fourth coupler coupled to the second receive chain; a second AIC circuit having an input coupled to the first coupler and an output coupled to the second receive chain; and a second routing device coupled between the third coupler and the input of the second AIC circuit, the second routing device being further coupled between the third coupler and the DIC circuit.

Aspect 21: The apparatus of Aspect 20, wherein: the first routing device is further coupled to the second AIC circuit; and the second routing device is further coupled to the first AIC circuit.

Aspect 22: The apparatus of Aspect 21, wherein the first AIC circuit comprises: at least one first AIC path coupled to the first routing device; and at least one second AIC path coupled to the second routing device.

Aspect 23: The apparatus of Aspect 22, wherein: the at least one first AIC path comprises multiple AIC paths; and the at least one second AIC path comprises a single AIC path.

Aspect 24: A method for wireless communication, comprising: transmitting a first transmit signal via a first transmit chain; receiving a first receive signal via a first receive chain; providing, to a first routing device via a first coupler, a first interference signal representing a signal at a node of the transmit chain; and providing, via the first routing device, the first interference signal to at least one of a first analog interference cancellation (AIC) circuit or a digital interference cancellation (DIC) circuit, an output of the first AIC circuit being coupled to a second coupler, wherein the second coupler is coupled to the first receive chain.

Aspect 25: The method of Aspect 24, wherein: the first interference signal is provided to the first AIC circuit; and the method further comprises: processing, via the first AIC circuit, the first interference signal from the first routing device to yield an interference reduction signal; and providing, via the second coupler, the interference reduction signal to an input of an amplifier of the first receive chain.

Aspect 26: The method of Aspect 25, further comprising downconverting, via a mixer, the first interference signal to yield a downconverted interference signal; and providing, via a second routing device, the downconverted interference signal to at least one of a second AIC circuit or the DIC circuit, an output of the second AIC circuit being coupled to a third coupler, wherein the third coupler is coupled to the first receive chain.

Aspect 27: The method according to any of Aspects 24-26, further comprising: generating, via an amplifier of the first receive chain, an amplified receive signal; demodulating, via a demodulator of the first AIC circuit, a signal representing the amplified receive signal based on the first interference signal to yield one or more demodulated signals; modulating, via a modulator of the first AIC circuit, the one or more demodulated signals based on the first interference signal to yield a modulated signal; and providing a signal representing the modulated signal to an input of the amplifier.

Aspect 28: The method according to any of Aspects 24-27, further comprising: transmitting a second transmit signal via a second transmit chain; receiving a second receive signal via a second receive chain; providing, to a second routing device via a third coupler, a second interference signal representing a signal at a node of the second transmit chain; and providing, via the second routing device, the second interference signal to at least one of a second AIC circuit or the DIC circuit, an output of the second AIC circuit being coupled to a fourth coupler, wherein the fourth coupler is coupled to the second receive chain.

Aspect 29: The method of Aspect 28, further comprising: providing, via the first routing device, the first interference signal to the second AIC circuit; and providing, via the second routing device, the second interference signal to the first AIC circuit.

Aspect 30: An apparatus for wireless communication, comprising: means for generating a transmit signal; means for processing a receive signal; means for providing an interference signal representing a signal at a node of the means for transmitting; means for processing the interference signal to yield an interference reduction signal; means for providing the interference reduction signal to the means for receiving; and means for providing the interference signal to a digital interference cancellation (DIC) circuit.

Within the present disclosure, the word “exemplary” is used to mean “serving as an example, instance, or illustration.” Any implementation or aspect described herein as “exemplary” is not necessarily to be construed as preferred or advantageous over other aspects of the disclosure. Likewise, the term “aspects” does not require that all aspects of the disclosure include the discussed feature, advantage, or mode of operation. The term “coupled” is used herein to refer to the direct or indirect coupling between two objects. For example, if object A physically touches object B and object B touches object C, then objects A and C may still be considered coupled to one another—even if objects A and C do not directly physically touch each other. For instance, a first object may be coupled to a second object even though the first object is never directly physically in contact with the second object. The terms “circuit” and “circuitry” are used broadly and intended to include both hardware implementations of electrical devices and conductors that, when connected and configured, enable the performance of the functions described in the present disclosure, without limitation as to the type of electronic circuits.

The apparatus and methods described in the detailed description are illustrated in the accompanying drawings by various blocks, modules, components, circuits, steps, processes, algorithms, etc. (collectively referred to as “elements”). These elements may be implemented using hardware, for example.

One or more of the components, steps, features, and/or functions illustrated herein may be rearranged and/or combined into a single component, step, feature, or function or embodied in several components, steps, or functions. Additional elements, components, steps, and/or functions may also be added without departing from features disclosed herein. The apparatus, devices, and/or components illustrated herein may be configured to perform one or more of the methods, features, or steps described herein.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean “one and only one” unless specifically so stated, but rather “one or more.” Unless specifically stated otherwise, the term “some” refers to one or more. A phrase referring to “at least one of” a list of items refers to any combination of those items, including single members. As an example, “at least one of: a, b, or c” is intended to cover at least: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase “means for” or, in the case of a method claim, the element is recited using the phrase “step for.”

Means for generating may include a transmit chain (e.g., transmit chain 501). Means for processing a receive signal may include a receive chain (e.g., receive chain 503). Means for providing may include a coupler (e.g., coupler 508). Means for processing an interference signal may include an AIC circuit (e.g., phase shifter 528 and amplifier 530). Means for providing an interference reduction signal may include a coupler (e.g., coupler 532) or routing device (e.g., routing device 510).

It is to be understood that the claims are not limited to the precise configuration and components illustrated above.

Various modifications, changes and variations may be made in the arrangement, operation and details of the methods and apparatus described above without departing from the scope of the claims.

The invention claimed is:

1. An apparatus for wireless communication, comprising:

a first transmit chain;

a first receive chain;

a first coupler coupled to the first transmit chain;

a second coupler coupled to the first receive chain;

a first analog interference cancellation (AIC) circuit having an input coupled to the first coupler and an output coupled to the first receive chain via the second coupler; and a first routing device coupled between the first coupler and the input of the first AIC circuit, the first routing device being further coupled between the first coupler and a digital interference cancellation (DIC) circuit, the first routing device being configured to selectively couple the first coupler to one of the first AIC circuit and the DIC circuit.

2. The apparatus of claim 1, wherein the output of the first AIC circuit is coupled to an input of an amplifier of the first receive chain.

3. The apparatus of claim 1, further comprising:

a second AIC circuit, wherein the first receive chain comprises an amplifier and a first mixer having an input coupled to an output of the amplifier and wherein the second AIC circuit has an output coupled to an output of the first mixer;

a second mixer having an input coupled to the first routing device; and a second routing device coupled between an output of the second mixer and an input of the second AIC circuit, wherein the second routing device is further coupled between the output of the second mixer and the DIC circuit.

4. The apparatus of claim 3, wherein the first AIC circuit is configured to perform interference cancellation for a first subset of channels, and wherein the second AIC circuit is configured to perform interference cancellation for a second subset of channels.

5. The apparatus of claim 3, wherein the first AIC circuit is configured to perform interference cancellation based on an interference-to-receiver-noise-floor ratio being greater than or equal to a first threshold, and wherein the second AIC circuit is configured to perform interference cancellation based on the interference-to-receiver-noise-floor ratio being less than a second threshold.

6. The apparatus of claim 1, further comprising a duplexer or a circulator coupled between the first transmit chain and the first receive chain.

7. The apparatus of claim 1, wherein the first routing device comprises a switch or a splitter.

8. The apparatus of claim 1, where the first AIC circuit comprises a first AIC path having at least one of a first phase shifter or a first amplifier.

9. The apparatus of claim 8, wherein the first AIC circuit comprises a second AIC path in parallel with the first AIC path, the second AIC path having at least one of a second phase shifter or a second amplifier.

10. The apparatus of claim 9, wherein the first AIC circuit comprises a delay element coupled between the first AIC path and the second AIC path.

11. The apparatus of claim 9, wherein:

the first AIC path comprises a first subband filter; and the second AIC path comprises a second subband filter.

12. The apparatus of claim 11, wherein at least one of the first subband filter or the second subband filter is configured to filter a signal at the input of the first AIC circuit based on a transmission waveform.

13. The apparatus of claim 1, wherein:

the first routing device is configured to provide a signal from the first coupler to the DIC circuit; and the DIC circuit is configured to:

process the signal from the first coupler for digital predistortion (DPD); and control the first AIC circuit based on the processing.

14. The apparatus of claim 1, wherein the first transmit chain is coupled to a first antenna interface, and wherein the first receive chain is coupled to a second antenna interface different than the first antenna interface.

15. The apparatus of claim 1, wherein the first receive chain comprises an amplifier and wherein the first AIC circuit comprises:

a third coupler coupled to an output of the amplifier of the first receive chain;

a demodulator having inputs coupled to the third coupler and the first routing device; and a modulator having inputs coupled to outputs of the demodulator and the first routing device, wherein an output of the modulator is coupled to the second coupler.

16. The apparatus of claim 15, further comprising weight adjustment components coupled to the outputs of the demodulator.

17. The apparatus of claim 1, further comprising a third coupler, wherein the first receive chain comprises an amplifier and wherein the third coupler is coupled to an output of the amplifier and to the DIC circuit.

18. The apparatus of claim 17, further comprising a switch coupled between the third coupler and the DIC circuit.

19. The apparatus of claim 1, wherein the first AIC circuit comprises a first interference cancellation (IC) path and a second IC path, and wherein at least one of a delay element or a filter is coupled between inputs of the first IC path and the second IC path.

20. The apparatus of claim 1, further comprising:

a second transmit chain;

a second receive chain;

a third coupler coupled to the second transmit chain;

a fourth coupler coupled to the second receive chain;

a second AIC circuit having an input coupled to the first coupler and an output coupled to the second receive chain; and a second routing device coupled between the third coupler and the input of the second AIC circuit, the second routing device being further coupled between the third coupler and the DIC circuit.

21. The apparatus of claim 20, wherein:

the first routing device is further coupled to the second AIC circuit; and the second routing device is further coupled to the first AIC circuit.

22. The apparatus of claim 21, wherein the first AIC circuit comprises:

at least one first AIC path coupled to the first routing device; and at least one second AIC path coupled to the second routing device.

23. The apparatus of claim 22, wherein:

the at least one first AIC path comprises multiple AIC paths; and the at least one second AIC path comprises a single AIC path.

24. A method for wireless communication, comprising:

transmitting a first transmit signal via a first transmit chain;

receiving a first receive signal via a first receive chain;

providing, to a first routing device via a first coupler, a first interference signal representing a signal at a node of the transmit chain; and providing, via the first routing device, the first interference signal to at least one of a first analog interference cancellation (AIC) circuit or a digital interference cancellation (DIC) circuit, an output of the first AIC circuit being coupled to a second coupler, wherein the second coupler is coupled to the first receive chain, wherein providing the first interference signal via the first routing device comprises selectively coupling the first coupler to one of the first AIC circuit and the DIC circuit via the first routing device.

25. The method of claim 24, wherein:

the first interference signal is provided to the first AIC circuit; and the method further comprises:

processing, via the first AIC circuit, the first interference signal from the first routing device to yield an interference reduction signal; and providing, via the second coupler, the interference reduction signal to an input of an amplifier of the first receive chain.

26. The method of claim 25, further comprising downconverting, via a mixer, the first interference signal to yield a downconverted interference signal; and providing, via a second routing device, the downconverted interference signal to at least one of a second AIC circuit or the DIC circuit, an output of the second AIC circuit being coupled to a third coupler, wherein the third coupler is coupled to the first receive chain.

27. The method of claim 24, further comprising:

generating, via an amplifier of the first receive chain, an amplified receive signal;

demodulating, via a demodulator of the first AIC circuit, a signal representing the amplified receive signal based on the first interference signal to yield one or more demodulated signals;

modulating, via a modulator of the first AIC circuit, the one or more demodulated signals based on the first interference signal to yield a modulated signal; and providing a signal representing the modulated signal to an input of the amplifier.

28. The method of claim 24, further comprising:

transmitting a second transmit signal via a second transmit chain;

receiving a second receive signal via a second receive chain;

providing, to a second routing device via a third coupler, a second interference signal representing a signal at a node of the second transmit chain; and providing, via the second routing device, the second interference signal to at least one of a second AIC circuit or the DIC circuit, an output of the second AIC circuit being coupled to a fourth coupler, wherein the fourth coupler is coupled to the second receive chain.

29. The method of claim 28, further comprising:

providing, via the first routing device, the first interference signal to the second AIC circuit; and providing, via the second routing device, the second interference signal to the first AIC circuit.

30. An apparatus for wireless communication, comprising:

means for generating a transmit signal;

means for processing a receive signal;

a first means for providing an interference signal representing a signal at a node of the means for generating;

an analog interference cancellation (AIC) circuit configured to process the interference signal to yield an interference reduction signal;

a second means for providing the interference reduction signal to the means for processing; and means for selectively coupling the first means for providing to one of the AIC circuit and a DIC circuit.

* * * * *